United States Patent
Fujishima

(10) Patent No.: US 6,839,975 B2
(45) Date of Patent: Jan. 11, 2005

(54) ACCURACY MEASURING APPARATUS FOR MACHINE TOOL

(75) Inventor: Makoto Fujishima, Yamatokoriyama (JP)

(73) Assignees: Mori Seiki Co., LTD, Yamatokoriyama (JP); Intelligent Manufacturing Systems International, Sacramento, CA (US)

( * ) Notice: Subject to any disclaimer, the term of this patent is extended or adjusted under 35 U.S.C. 154(b) by 0 days.

(21) Appl. No.: 10/269,076

(22) Filed: Oct. 11, 2002

(65) Prior Publication Data

US 2003/0106228 A1 Jun. 12, 2003

(30) Foreign Application Priority Data

Oct. 15, 2001 (JP) .......................... 2001-317240

(51) Int. Cl.[7] .............................................. G01B 11/27
(52) U.S. Cl. .............................. 33/502; 33/645; 382/152
(58) Field of Search ..................... 33/613, 645, 632, 33/638, 639, 642, 502; 250/252.1; 382/152; 356/314

(56) References Cited

U.S. PATENT DOCUMENTS

| | | | |
|---|---|---|---|
| 5,029,097 A | | 7/1991 | Michigami et al. |
| 5,148,232 A | | 9/1992 | Duey et al. ................. 356/152 |
| 5,224,052 A | | 6/1993 | Hamar |
| 5,251,156 A | * | 10/1993 | Heier et al. .................... 33/503 |
| 5,255,199 A | * | 10/1993 | Barkman et al. ........... 382/152 |
| 5,533,146 A | * | 7/1996 | Iwai ............................ 382/152 |
| 6,583,883 B2 | * | 6/2003 | Egelhof ....................... 382/152 |
| 6,606,403 B2 | * | 8/2003 | Freifeld ....................... 382/152 |
| 6,614,042 B2 | * | 9/2003 | Yasuda et al. .......... 250/559.45 |
| 2002/0189319 A1 | * | 12/2002 | Abbe .......................... 73/1.01 |
| 2003/0184768 A1 | * | 10/2003 | Fujishima et al. .......... 356/614 |
| 2003/0198385 A1 | * | 10/2003 | Tanner et al. ............... 382/195 |

FOREIGN PATENT DOCUMENTS

| | | |
|---|---|---|
| DE | 100 37 532 A1 | 2/2001 |
| DE | 299 13 445 U1 | 2/2001 |

OTHER PUBLICATIONS

Patent Abstracts of Japan, Publication No. 04–082651, dated Mar. 16, 1992.
Patent Abstracts of Japan, Publication No. 10–138097, dated May 26, 1998.

* cited by examiner

*Primary Examiner*—G. Bradley Bennett
(74) *Attorney, Agent, or Firm*—Westerman, Hattori, Daniels & Adrian, LLP

(57) ABSTRACT

The present invention relates to an accuracy measuring apparatus which is capable of efficiently measuring the accuracies of a machine tool at low costs. The accuracy measuring apparatus (1) comprises a laser oscillator (2) attached to a spindle (15) of the machine tool (10) for projecting a light beam having an axis aligning with the axis of the spindle, a CCD camera (3) disposed in opposed relation to the laser oscillator (2) for receiving the light beam projected from the laser oscillator (2) and generating two-dimensional image data, and an analyzer (4) for analyzing the image data to determine the accuracies of the machine tool (10).

5 Claims, 9 Drawing Sheets

F I G. 1
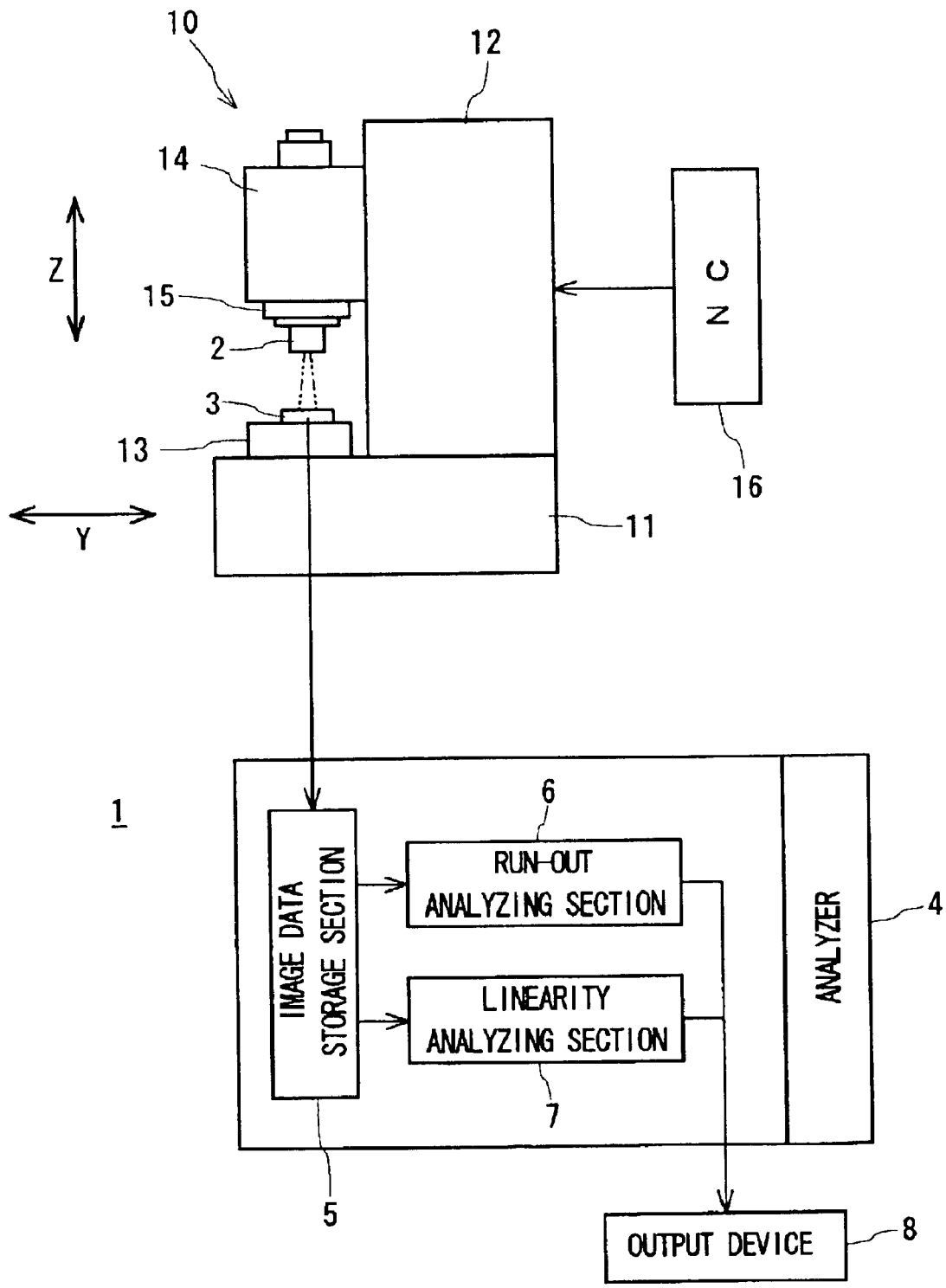

F I G. 1 1

| Position of spindle head in Z-axis (mm) | Offset of center position ΔXa (mm) | Offset of center position ΔYa(mm) |
|---|---|---|
| 0 | 0 | 0 |
| −5 | 0.001 | 0.002 |
| −10 | 0.003 | 0.002 |
| −15 | 0.004 | 0.003 |
| −20 | 0.003 | 0.003 |
| −25 | 0.002 | 0.002 |
| −30 | 0.001 | 0.002 |
| −35 | 0.001 | 0.001 |
| −40 | −0.001 | 0 |
| −45 | −0.002 | 0 |
| −50 | −0.003 | −0.001 |
| −55 | −0.004 | −0.002 |
| −60 | −0.003 | −0.002 |
| −70 | −0.004 | −0.002 |
| −75 | −0.003 | −0.003 |
| −80 | −0.002 | −0.002 |
| −85 | −0.001 | −0.001 |
| −90 | −0.001 | 0 |
| −95 | −0.001 | 0.001 |
| −100 | −0.002 | 0.001 |

ACCURACY MEASURING APPARATUS FOR MACHINE TOOL

BACKGROUND OF THE INVENTION

1. Field of the Invention

The present invention relates to an accuracy measuring apparatus for measuring the run-out accuracy of a spindle and the feed linearity of a feed mechanism in a machine tool.

2. Description of Related Art

Before machine tools are shipped from a machine tool maker to users, the run-out accuracy of a spindle and the feed linearity of a feed mechanism, which directly influence the machining accuracy of the machine tools, are generally checked and adjusted to satisfy predetermined reference levels.

One exemplary method for measuring the run-out accuracy is such that a cylindrical test tool having a highly accurately finished outer circumference or a test tool having a spherical ball attached to a shaft is fitted in a tapered portion of a spindle hole and rotated about an axis thereof, and an offset of the outer circumference of the test tool is measured, whereby the run-out of the test tool is detected on the basis of the measured offset. Another known method is such that a parabolic mirror having a small diameter is attached to an end of the spindle on the center axis of the spindle, then a light beam emitted from a microscope with a light axis generally aligned with the center axis of the spindle is reflected on the parabolic mirror, and the reflected light beam is introduced into the microscope to be photographed on a film, whereby the run-out of the center axis is determined on the basis of the results of the photographing.

One known method for measuring the feed linearity of the feed mechanism is such that a straightedge is attached to a slide to be fed by a feed mechanism, and a measurement surface of the straightedge is detected by a dial indicator while the slide is fed. Another know method is such that a reflection mirror is attached to a slide to be fed, then a light beam is projected from an autocollimator onto the reflection mirror and the light beam reflected on the reflection mirror is received by the autocollimator while the slide is fed, whereby the feed linearity is determined on the basis of a change in reflection angle.

However, the aforesaid measuring methods are merely capable of measuring either the run-out accuracy or the feed linearity. Therefore, measuring apparatuses should separately be prepared for measuring the run-out accuracy and the feed linearity. Thus, these methods are poor in efficiency, and costly.

In view of the foregoing, it is an object of the present invention to provide an accuracy measuring apparatus which is capable of efficiently measuring the accuracies of a machine tool at low costs.

SUMMARY OF THE INVENTION

In accordance with the present invention to achieve the aforesaid object, there is provided an accuracy measuring apparatus for a machine tool, which comprises: light projecting means attached to a spindle of the machine tool for projecting a light beam having an axis aligning with an axis of the spindle; photographing means disposed in opposed relation to the light projecting means for receiving the light beam projected from the light projecting means and generating two-dimensional image data; and analyzing means for analyzing the image data to determine an accuracy of the machine tool.

In the accuracy measuring apparatus, the light beam having the axis aligning with the axis of the spindle is projected from the light projecting means disposed on the spindle of the machine tool. The projected light beam is received by the photographing means, and image data consisting of two-dimensionally arranged density data is generated by the photographing means.

A preferred example of the photographing means is a CCD camera. The CCD camera includes a plurality of photoelectric conversion devices arranged in a two-dimensional array having plural lines and plural rows. The CCD camera digitizes voltage signals outputted from the respective photoelectric conversion devices according to received light amounts, and then converts the voltage signals into density levels, which are outputted as two-dimensional density image data having the same arrangement as that of the photoelectric conversion devices.

The light beam projected from the light projecting means has a round cross section, so that the two-dimensional density image obtained by the photographing means has a round low density level portion. The analyzing means binarizes the two-dimensional density image data thus obtained by the photographing means on the basis of a predetermined threshold value to extract an image portion corresponding to the projected light beam. Then, the analyzing means analyzes the resulting binary image to determine the accuracy of the machine tool.

Where the spindle is rotated by a predetermined angle when the spindle has a run-out, for example, the position of the center of a binary image obtained after the rotation is offset from the position of the center of a binary image obtained before the rotation in accordance with the run-out. Therefore, the analyzing means computes the positions of the centers of the binary images obtained before and after the rotation, and then computes a difference between the center positions to determine a static run-out accuracy of the spindle.

Where the spindle significantly runs out in one direction when being rotated at a predetermined rotation speed, the projected light beam draws an elliptical shape elongated in that direction. Where the spindle runs out equally in two directions perpendicular to each other, the projected light beam draws a round shape having a diameter greater than that of the light beam. Therefore, the analyzing means superposes binary images obtained at predetermined time intervals during the rotation of the spindle, and computes a deformation (with respect to a binary image of the projected light beam obtained before the rotation of the spindle) to determine a dynamic run-out accuracy of the spindle.

Where the spindle of the machine tool is constructed so as to be fed toward and away from the photographing means by a feed mechanism, for example, the position of the center of the binary image varies depending on the position of the spindle if a feed path of the feed mechanism meanders. Therefore, the analyzing means computes the positions of the centers of binary images obtained when the spindle is located at different positions during the movement of the spindle, and then computes offsets of the center positions to determine the feed linearity of the feed mechanism.

In accordance with the present invention, a plurality of accuracies including the static and dynamic run-out accuracies of the spindle and the feed linearity of the feed mechanism are thus determined by the single accuracy measuring apparatus. Therefore, the accuracies of the machine tool can efficiently be determined at low costs.

The light projecting means preferably comprises a laser oscillator for emitting a laser beam, which is excellent in linearity and convergence.

BRIEF DESCRIPTION OF THE DRAWINGS

FIG. 1 is a block diagram illustrating the schematic construction of an accuracy measuring apparatus according to one embodiment of the present invention;

FIG. 11 is a diagram illustrating, by way of example, the results of the process performed by the linearity analyzing section according to the embodiment.

DESCRIPTION OF THE PREFERRED EMBODIMENT

Figure 2:
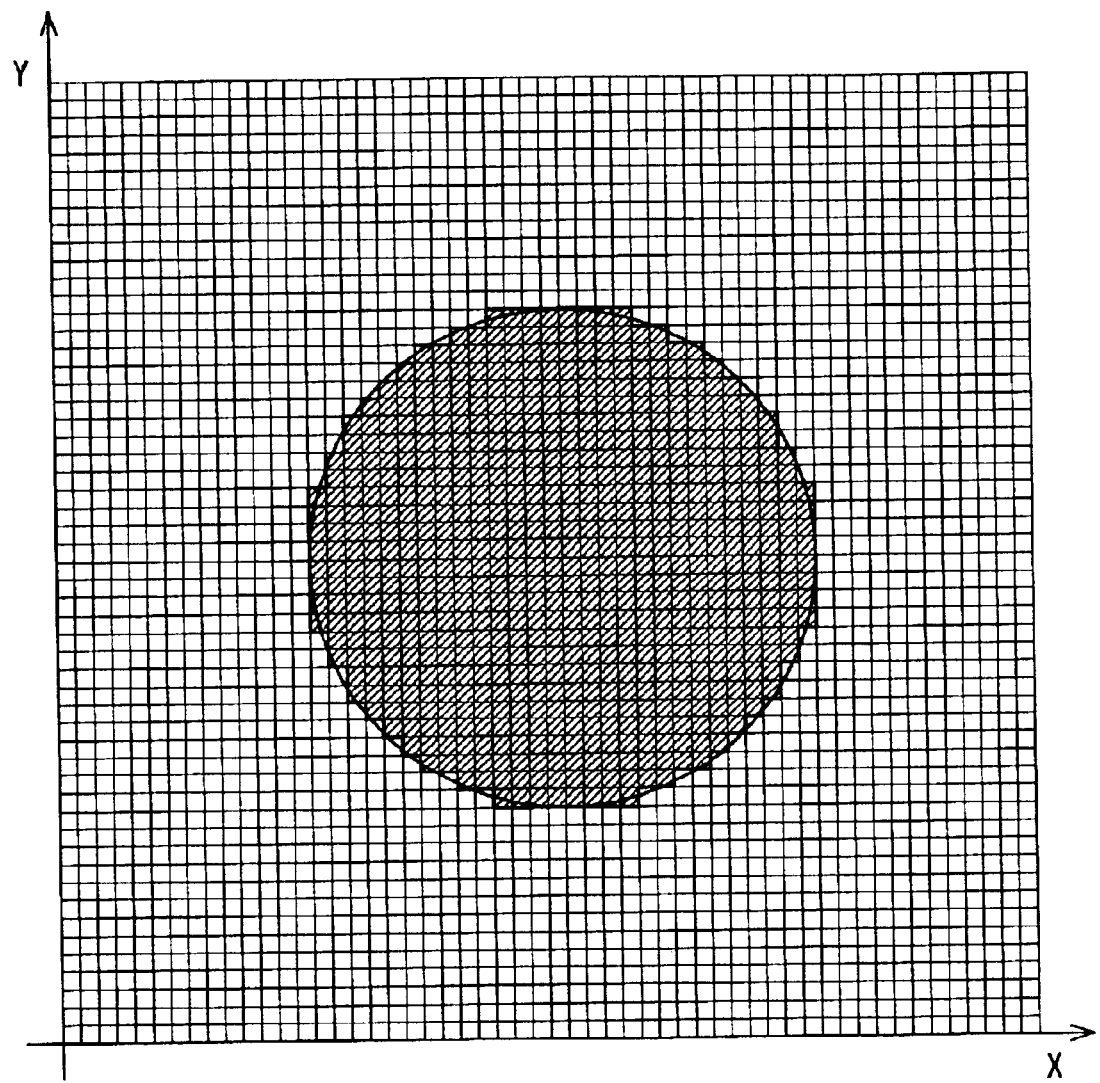
FIG. 2 is an explanatory diagram illustrating a two-dimensional density image obtained by a CCD camera on a reverse basis in accordance with the embodiment.

A preferred embodiment of the present invention will hereinafter be described with reference to the attached drawings. FIG. 1 is a block diagram illustrating the schematic construction of an accuracy measuring apparatus according to the embodiment of the present invention.

As shown in FIG. 1, the accuracy measuring apparatus 1 according to this embodiment comprises a laser oscillator 2 attached to a spindle 15 of the machine tool 10, a CCD camera 3 fixed on a table 13 of the machine tool 10 in opposed relation to the laser oscillator 2, an analyzer 4 for analyzing an image obtained by the CCD camera 3 to determine accuracies of the machine tool 10, and an output device 8 including a CRT and a printer for displaying and printing out the results of the analysis performed by the analyzer 4.

The machine tool 10 according to this embodiment is a so-called vertical machining center, and mainly comprises a bed 11, a column 12 fixed on the bed 11, a table 13 provided on the bed 11 movably along two axes perpendicular to each other (along the X-axis and the Y-axis) within a horizontal plane, a spindle head 14 supported by the column 12 in a vertically movable manner (along the Z-axis) and supporting the spindle 15 rotatably about the axis of the spindle, a first feed mechanism (not shown) for moving the table 13 along the X-axis, a second feed mechanism (not shown) for moving the table 13 along the Y-axis, a third feed mechanism (not shown) for moving the spindle head 14 along the Z-axis, and a numerical controller (NC) 16 for controlling operations of the first, second and third feed mechanisms.

The laser oscillator 2 is a device for projecting a laser beam, and is attached to the spindle 15 so that the axis of the laser beam aligns with the axis of the spindle 15. The laser beam is advantageous because of its excellent light axis linearity and light flux convergence.

The CCD camera 3 includes a plurality of photoelectric conversion devices arranged in a two-dimensional array having plural lines and plural rows. The CCD camera 3 is adapted to digitize voltage signals outputted from the respective photoelectric conversion devices according to received light amounts and then convert the voltage signals into density levels, which are outputted as two-dimensional density image data having the same arrangement as that of the photoelectric conversion devices.

The laser beam projected from the laser oscillator 2 has a round cross section. Therefore, the two-dimensional density image obtained by the CCD camera 3 has a round low density level portion. An example of the density image is shown in FIG. 2. In FIG. 2, each square in the array represents a pixel, and a circle depicted by a bold line corresponds to the contour of the laser beam. Pixels in a hatched portion which have a lower density level constitute a laser beam image. In FIG. 2, the image is illustrated with its density levels being reversed for convenience of explanation.

The analyzer 4 includes an image data storage section 5 for storing the two-dimensional image data outputted from the CCD camera 3, and a run-out analyzing section 6 and a linearity analyzing section 7 for analyzing the two-dimensional density image data stored in the image data storage section 5 to determine the run-out accuracy of the spindle 15 and the feed linearity of the third feed mechanism (not shown), respectively.

Figure 3:
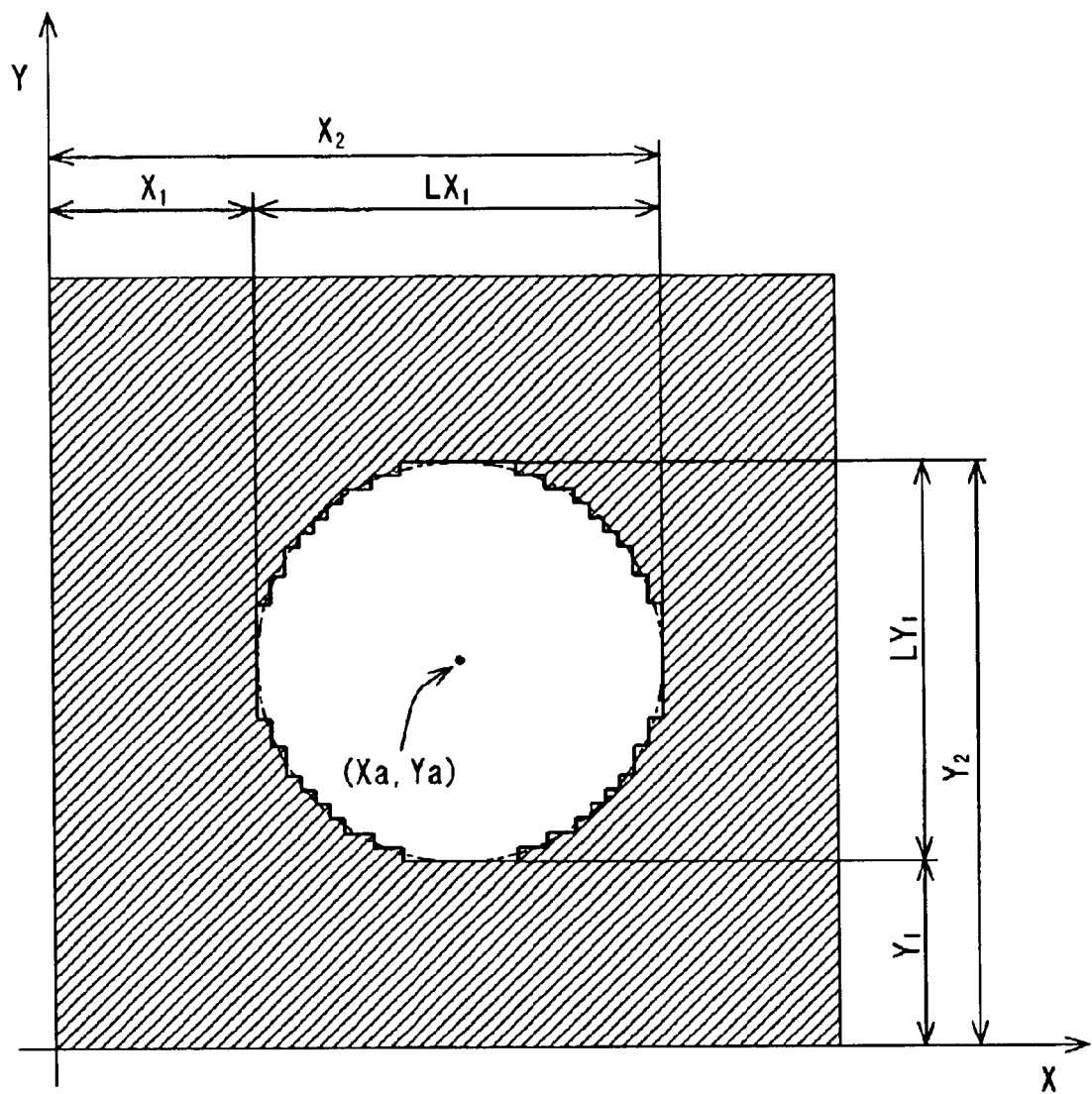
FIG. 3 is a diagram for explaining a process to be performed by a run-out analyzing section according to the embodiment.

The run-out analyzing section 6 and the linearity analyzing section 7 first read the two-dimensional density image data from the image data storage section 5 and then binarize the density image data on the basis of a predetermined threshold value to extract an image portion corresponding to the laser beam. An image obtained by the binarization of the density image shown in FIG. 2 is illustrated in FIG. 3. In FIG. 3, squares indicative of the respective pixels are not shown, and pixels in a hatched portion are black. This is true in FIGS. 4 to 6. Further, a circle depicted by a two-dot-and-dash line corresponds to the contour of the laser beam.

As described above, the run-out analyzing section 6 and the linearity analyzing section 7 analyze the binary image obtained by the binarization to determine the accuracies of the machine tool 10. Specific processes to be performed by the run-out analyzing section 6 and the linearity analyzing section 7 will hereinafter be described.

First, an explanation will be given to an analyzing process to be performed by the run-out analyzing section 6 for determination of the static run-out accuracy of the spindle 15. Where the spindle 15 is rotated by a predetermined angle when the spindle 15 has a run-out, the position of the center of a binary image obtained after the rotation is offset from the position of the center of a binary image obtained before the rotation in accordance with the run-out. From the image data storage section 5, the run-out analyzing section 6 reads out images obtained by the CCD camera 3 at different angular positions of the spindle 15 when the spindle 15 is rotated stepwise by a predetermined angle (e.g., 5 degrees) to make one turn, and binarizes the images. Then, the run-out analyzing section 6 computes the positions of the centers of the binary images (white images), and computes a maximum offset of the center position as the static run-out accuracy of the spindle 15.

The position of the center of each white image can be calculated in the following manner. The binary image shown in FIG. 3 is scanned in a raster direction. Then, the positions of white pixels on the boundary of the white image with respect to the X-direction (X-axis) and the Y-direction (Y-axis) are detected, and the coordinates (Xa, Ya) of the center position of the white image are calculated on the basis of the detected boundary positions.

Provided that the boundary positions with respect to the X-directions are $X_1$, $X_2$ and the boundary positions with respect to the Y-direction are $Y_1$, $Y_2$, the coordinates of the center (Xa, Ya) are represented by the following expressions:

$$Xa=(X_1+X_2)/2$$

$$Ya=(Y_1+Y_2)/2$$

The run-out analyzing section 6 thus calculates the center positions of the white images obtained at the respective angular positions during the rotation of the spindle, and computes maximum offsets of the center position in the X- and Y-directions as the static run-out accuracies of the spindle 15 with respect to the respective directions.

Alternatively, the static run-out accuracies may be calculated in the following manner. First, the lengths (diameters) of a white image measured in the X- and Y-directions are calculated when the rotation angle of the spindle 15 is zero degree. Then, white images obtained by binarizing the images obtained at the respective angular positions during the rotation of the spindle are sequentially superposed. In turn, the lengths of the superposed white images measured in the X- and Y-directions are calculated, and differences between the lengths of the white image measured in the X- and Y-directions when the rotation angle is zero degree and the lengths of the superposed white images measured in the X- and Y-directions are calculated as the static run-out accuracies of the spindle 15 with respect to the respective directions.

Figure 4:
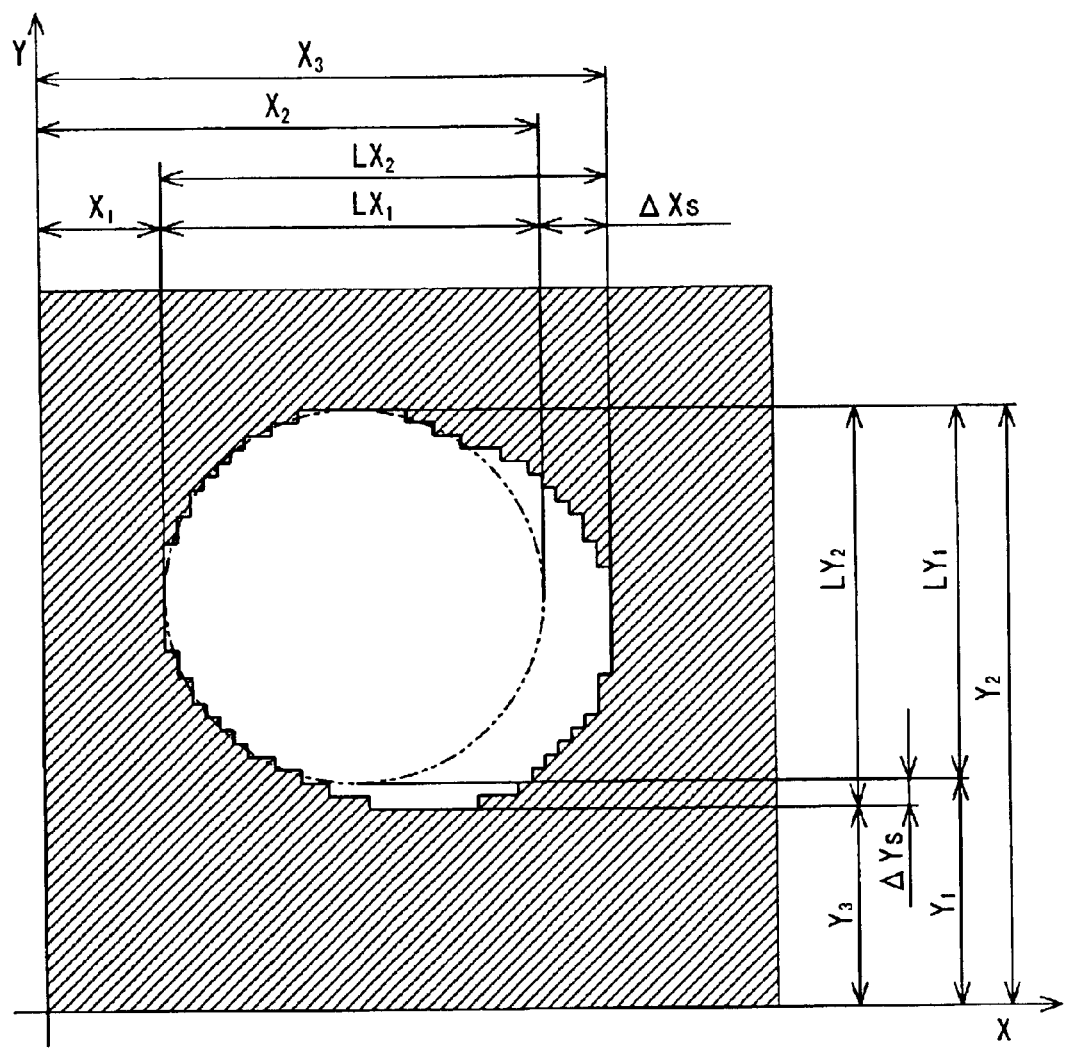
FIG. 4 is a diagram for explaining the process to be performed by the run-out analyzing section according to the embodiment.

Provided that the lengths of the white image (a bold line indicates the contour of the laser beam) measured in the X- and Y-directions when the rotation angle of the spindle 15 is zero degree are $LX_1$, $LY_1$ and the lengths of the superposed white images measured in the X- and Y-directions are $LX_2$, $LY_2$ in FIG. 4, the static run-out accuracies $\Delta Xs$, $\Delta Ys$ of the spindle 15 with respect to the X- and Y-directions are calculated from the following expressions:

$$\Delta Xs=LX_2-LX_1$$

$$\Delta Ys=LY_2-LY_1$$

In FIG. 4, reference characters $X_3$, $Y_3$ denote boundary positions of the superposed white images.

Next, an explanation will be given to an analyzing process to be performed by the run-out analyzing section 6 for determination of the dynamic run-out accuracy of the spindle 15. Where the spindle 15 significantly runs out in one direction when being rotated at a predetermined rotation speed, the laser beam draws an elliptical shape elongated in that direction. Where the spindle runs out equally in two directions perpendicular to each other, the laser beam draws a round shape having a diameter greater than that of the laser beam.

From the image data storage section 5, the run-out analyzing section 6 reads out an image obtained by the CCD camera 3 when the spindle 15 is at a halt, and binarizes the image to generate a white image at the halt of the spindle 15. Then, the lengths $LX_1$, $LY_1$ of the generated white image measured in the X- and Y-directions are calculated in the aforesaid manner.

From the image data storage section 5, the run-out analyzing section 6 reads images obtained by the CCD camera 3 at predetermined time intervals during the rotation of the spindle 15, and binarizes the images to generate white images. Then, the run-out analyzing section 6 sequentially superposes the generated white images.

Figure 5:
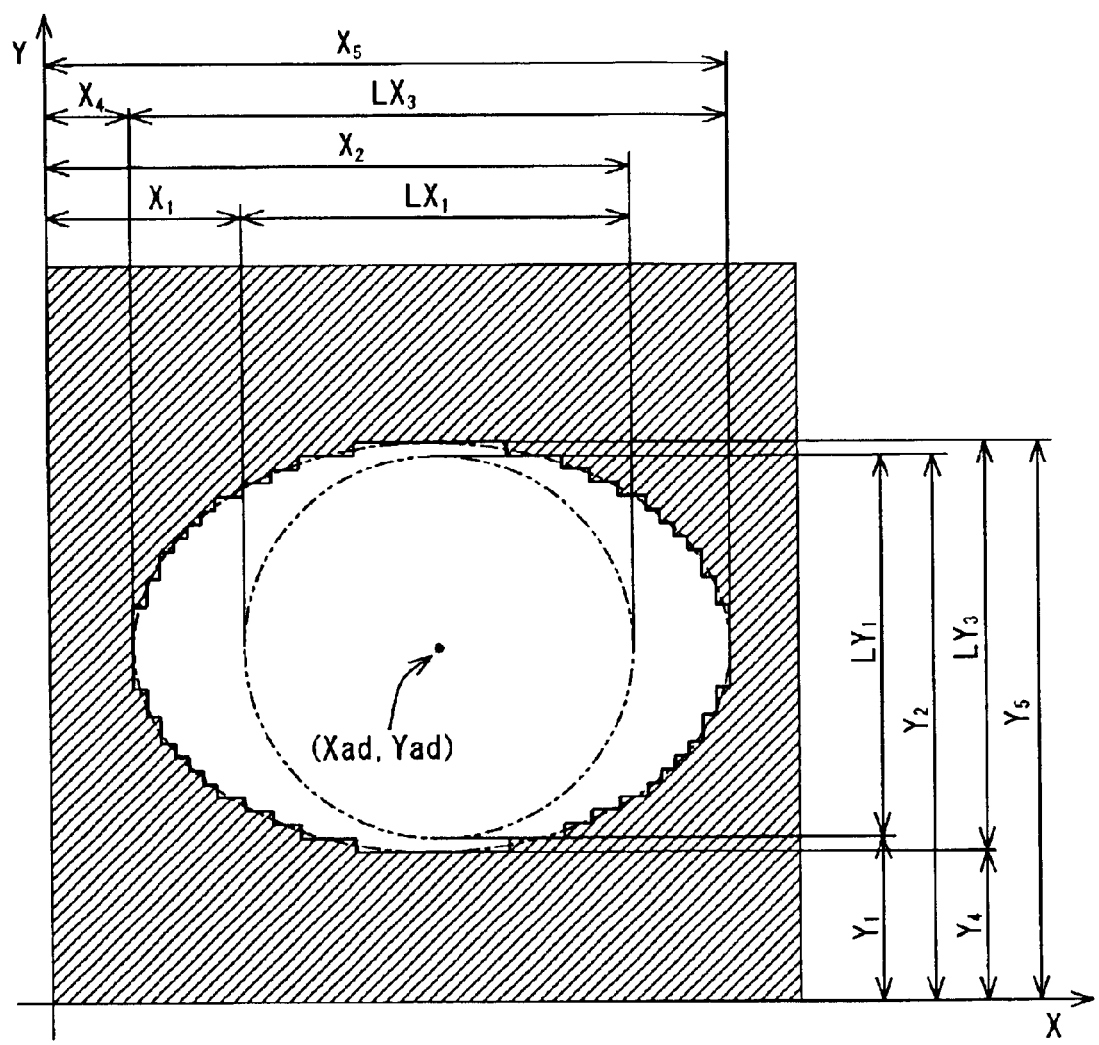
FIG. 5 is a diagram for explaining the process to be performed by the run-out analyzing section according to the embodiment.
Figure 6:
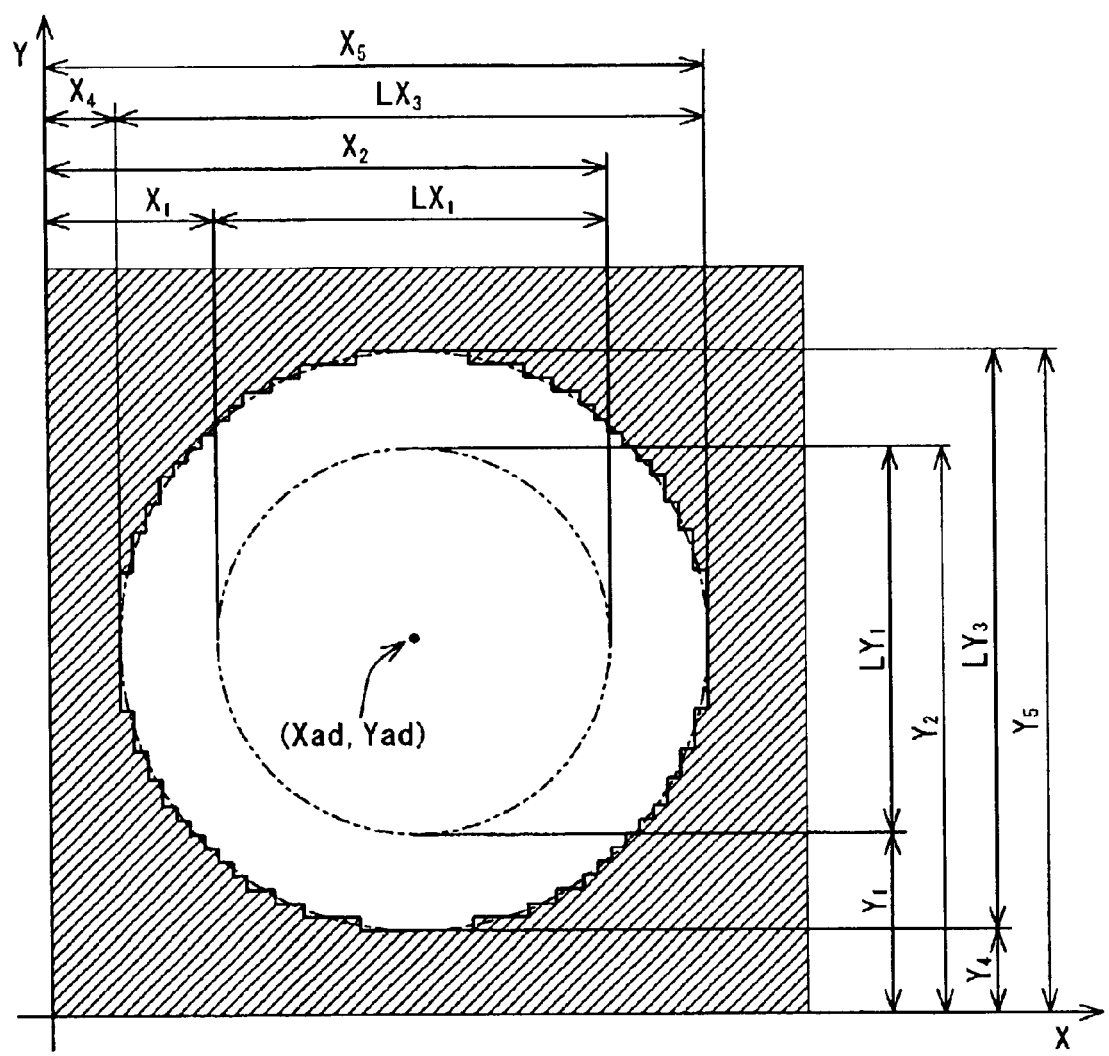
FIG. 6 is a diagram for explaining the process to be performed by the run-out analyzing section according to the embodiment.

FIG. 5 illustrates, by way of example, superposed white images obtained when the spindle 15 significantly runs out in the X-direction. FIG. 6 illustrates, by way of example, superposed white images obtained when the spindle 15 runs out equally in the X- and Y-directions.

The run-out analyzing section 6 calculates the lengths $LX_3$, $LY_3$ of the superposed white images measured in the X- and Y-directions, and then calculates the dynamic run-out accuracies $\Delta Xd$, $\Delta Yd$ of the spindle 15 with respect to the X- and Y-directions from the following expressions:

$$\Delta Xd=LX_3-LX_1$$

$$\Delta Yd=LY_3-LY_1$$

Further, the center position (Xad, Yad) of the superposed white images, i.e., the center of the rotation of the spindle 15, is calculated from the following expressions:

$$Xad=(X_4+X_5)/2$$

$$Yad=(Y_4+Y_5)/2$$

On the other hand, the average (Xav, Yav) of the center positions (Xa, Ya) of the white images calculated for the respective angular positions of the spindle in the static run-out analyzing process is regarded as the static rotation center of the spindle 15. Therefore, a difference between the center position (Xad, Yad) and the average center position (Xav, Yav) is calculated as an offset of the rotation center of the spindle 15 in a dynamic state from the rotation center of the spindle 15 in a static state. The run-out analyzing section 6 may be adapted to perform such a process.

Figure 7:
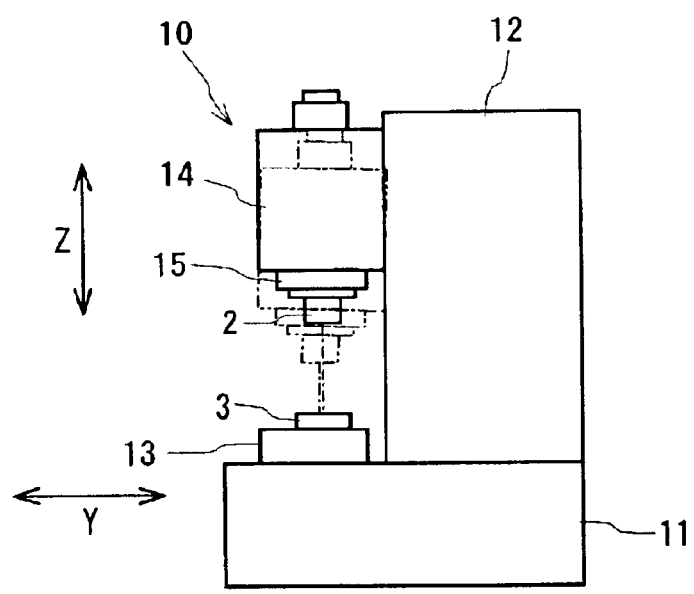
FIG. 7 is a diagram for explaining a process to be performed by a linearity analyzing section according to the embodiment.
Figure 8:
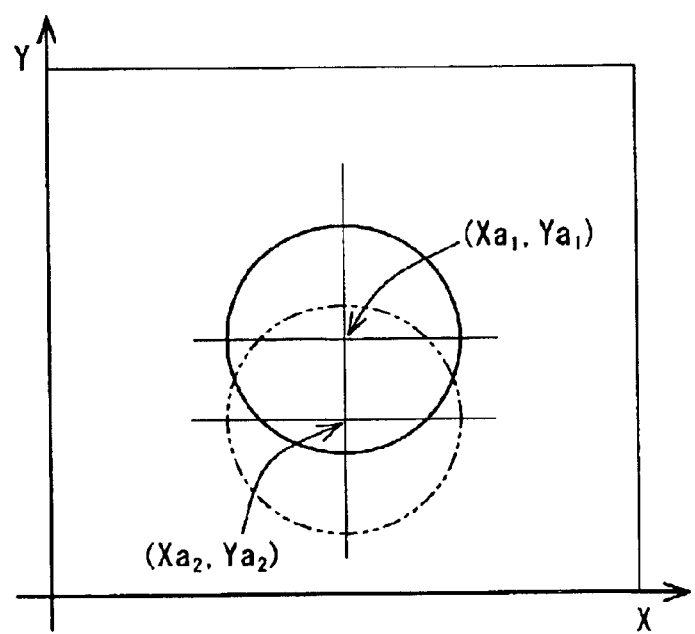
FIG. 8 is a diagram for explaining the process to be performed by the linearity analyzing section according to the embodiment.
Figure 9:
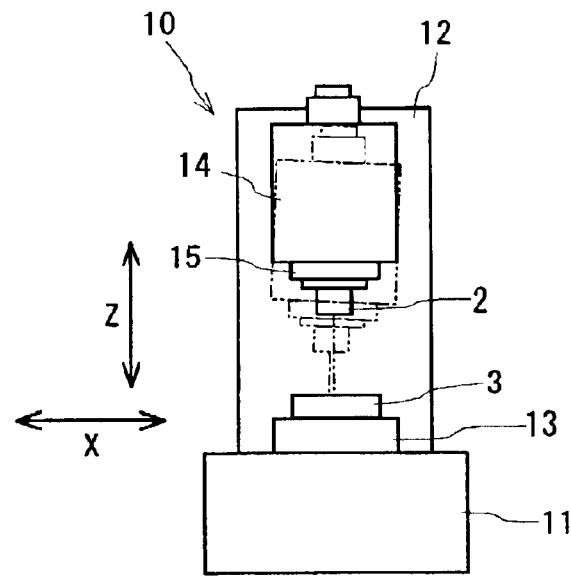
FIG. 9 is a diagram for explaining the process to be performed by the linearity analyzing section according to the embodiment.
Figure 10:
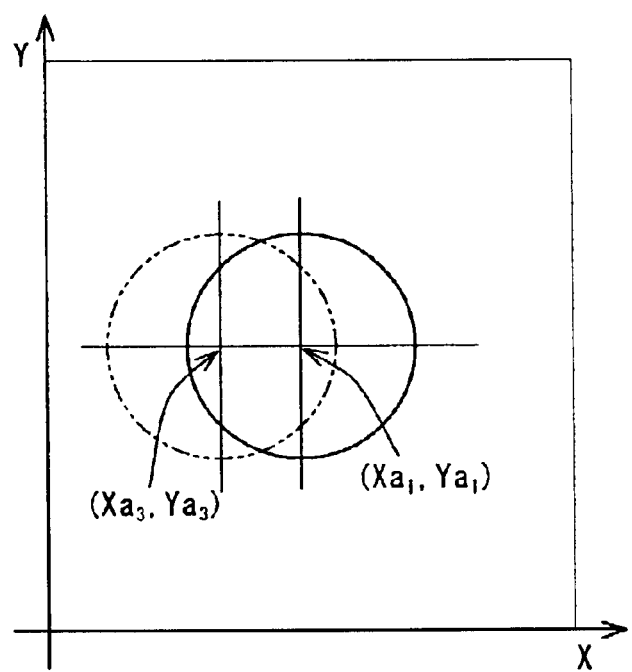
FIG. 10 is a diagram for explaining the process to be performed by the linearity analyzing section according to the embodiment.

Next, an explanation will be given to an analyzing process to be performed by the linearity analyzing section 7 for determination of the feed linearity of the third feed mechanism (not shown).

Where the feed path of the third feed mechanism (not shown) for feeding the spindle head 14 meanders in the Y-direction as shown in FIG. 7, the position of the center of the white image is offset in the Y-direction in accordance with the position of the spindle head 14. FIG. 8 illustrates the offset of the center position of the white image. In FIG. 8, a circle depicted by a solid line indicates the contour of a white image obtained when the spindle head 14 is located in a position shown by a solid line in FIG. 7, and a circle depicted by a two-dot-and-dash line indicates the contour of a white image obtained when the spindle head 14 is located in a position shown by a two-dot-and-dash line in FIG. 7. Coordinates $(Ya_1, Ya_1)$, $(Xa_2, Ya_2)$ represent the center positions of the respective white images.

Where the feed path of the third feed mechanism (not shown) meanders in the X-direction as shown in FIG. 9, the position of the center of the white image is offset in the X-direction in accordance with the position of the spindle head 14. FIG. 10 illustrates the offset of the center position of the white image. In FIG. 10, a circle depicted by a solid line indicates the contour of a white image obtained when the spindle head 14 is located in a position shown by a solid line in FIG. 9, and a circle depicted by a two-dot-and-dash line indicates the contour of a white image obtained when the spindle head 14 is located in a position shown by a two-dot-and-dash line in FIG. 9. Coordinates ($Ya_1$, $Ya_1$), ($Xa_3$, $Ya_3$) represent the center positions of the respective white images.

Therefore, the spindle head 14 is moved stepwise by a predetermined distance, and the center positions of white images obtained at the respective movement positions of the spindle head 14 are computed to determine the feed linearity of the third feed mechanism (not shown).

From the image data storage section 5, the linearity analyzing section 7 reads out images obtained by the CCD camera 3 at the respective movement positions of the spindle head 14, and binarizes the images to generate white images. Then, the linearity analyzing section 7 computes the center positions of the white images thus generated. A difference between the center position ($Xa_1$, $Ya_1$) of the white image obtained before the movement of the spindle head 14 and the center position ($Xa_k$, $Ya_k$) obtained at each of the movement positions of the spindle head 14 is calculated, and an offset ($\Delta Xa$, $\Delta Ya$) of the center position for each of the movement positions of the spindle head is calculated from the following expressions:

$$\Delta Xa = Xa_1 - Xa_k$$

$$\Delta Ya = Ya_1 - Ya_k$$

wherein k=1 to n.

The offsets ($\Delta Xa$, $\Delta Ya$) of the center positions thus calculated by the linearity analyzing section 7 are shown in FIG. 11 by way of example.

In the accuracy measuring apparatus 1 according to this embodiment, as detailed above, the run-out analyzing section 6 and the linearity analyzing section 7 properly analyzes the density image data obtained by photographing the laser beam projected from the laser oscillator 2 by the CCD camera 3 when the spindle 15 assumes the respective states to determine the static and dynamic run-out accuracies of the spindle 15 and the feed linearity of the third feed mechanism (not shown).

The accuracy measuring apparatus 1 according to this embodiment measures a plurality of accuracies including the static and dynamic accuracies of the spindle 15 and the feed linearity of the feed mechanism (not shown). Thus, the accuracies of the machine tool can efficiently be determined at low costs.

While the present invention has thus been described by way of the embodiment thereof, the present invention is not limited to the embodiment, but may be embodied in any other conceivable ways. Although the embodiment is directed to determine the accuracies of the vertical machining center 10, the present invention is applicable to any other machine tools such as horizontal machining centers and laths.

The accuracy measuring apparatus may be constructed such that the laser oscillator 2 is accommodated in a tool magazine and periodically attached to the spindle 15 by an automatic tool changer for measurement of the accuracies. With this arrangement, the static and dynamic run-out accuracies of the spindle 15 and the feed linearity of the feed mechanism (not shown) can periodically be checked. If any of the accuracies is deteriorated, proper measures against the accuracy deterioration can be taken (e.g., for repair) to maintain the machine tool in good conditions for a prolonged period of time.

In the aforesaid embodiment, a light receiving portion of the CCD camera 3 may be covered with a cap when accuracy measuring operations are not performed. Although the CCD camera 3 is fixed on the table 13 in the aforesaid embodiment, the position of the CCD camera 3 is not limited thereto. For example, the CCD camera 3 may be disposed in the vicinity of the table 13 and adapted to be brought into or out of opposed relation to the laser oscillator 2 by proper driving means.

What is claimed is:

1. An accuracy measuring apparatus for a machine tool, comprising:

light projecting means attached to a spindle of the machine tool for projecting a light beam having an axis aligning with an axis of the spindle;

photographing means disposed in opposed relation to the light projecting means for receiving the light beam projected from the light projecting means and generating two-dimensional image data; and analyzing means for analyzing the image data to determine an accuracy of the machine tool.

2. An accuracy measuring apparatus as set forth in claim 1, wherein the photographing means is a CCD camera including a plurality of photoelectric conversion devices arranged in a two-dimensional array.

3. An accuracy measuring apparatus as set forth in claim 1, wherein the light projecting means is a laser oscillator for emitting a laser beam.

4. An accuracy measuring apparatus as set forth in claim 1, wherein the analyzing means analyzes a run-out accuracy of the spindle.

5. An accuracy measuring apparatus as set forth in claim 1, wherein the analyzing means analyzes a feed linearity of a feed mechanism of the machine tool.

* * * * *